United States Patent
Burns et al.

(10) Patent No.: US 8,078,207 B2
(45) Date of Patent: Dec. 13, 2011

(54) SYSTEM AND METHOD OF AUTOMATICALLY MAINTAINING A LINE-OF-SIGHT COMMUNICATION CHANNEL

(75) Inventors: Robert Burns, St. Petersburg, FL (US); Kurt Holmquist, Lutz, FL (US); Dean R. Hellickson, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 374 days.

(21) Appl. No.: 12/506,730

(22) Filed: Jul. 21, 2009

(65) Prior Publication Data

US 2011/0021231 A1    Jan. 27, 2011

(51) Int. Cl.
   *H04B 7/00*    (2006.01)

(52) U.S. Cl. ............. 455/509; 455/456.1; 455/464; 455/450; 370/328; 370/329

(58) Field of Classification Search .......... 455/509, 455/456, 435, 406, 404.2, 404.1, 456.1, 456.3, 455/521, 414.2, 432, 450, 451, 452.1, 419, 455/418, 464; 370/352, 353, 354, 355, 400
See application file for complete search history.

(56) References Cited

U.S. PATENT DOCUMENTS

| 6,327,533 | B1 | 12/2001 | Chou |
| 7,050,786 | B2 * | 5/2006 | Caci ........................... 455/404.2 |
| 7,136,645 | B2 * | 11/2006 | Hanson et al. ............. 455/435.1 |
| 7,171,226 | B2 | 1/2007 | Crocker et al. |
| 7,330,728 | B1 | 2/2008 | Moll et al. |
| 2003/0148771 | A1 * | 8/2003 | de Verteuil .................... 455/456 |
| 2004/0196783 | A1 * | 10/2004 | Shinomiya .................... 370/216 |
| 2005/0272011 | A1 * | 12/2005 | Herman et al. ................. 434/11 |
| 2006/0270383 | A1 | 11/2006 | Yergens et al. |
| 2008/0114874 | A1 * | 5/2008 | Meir et al. .................... 709/224 |
| 2010/0061308 | A1 * | 3/2010 | Becker et al. ................. 370/328 |

* cited by examiner

*Primary Examiner* — Tan Trinh
(74) *Attorney, Agent, or Firm* — Fogg & Powers LLC

(57) ABSTRACT

One exemplary embodiment is directed to a method of automatically maintaining a line-of-sight communication channel. The method comprises determining information about each communication resource that is accessible in a region through which a mobile system is moving. The method further comprises determining information about the mobile system. The method further comprises performing a line-of-sight (LOS) analysis for each of the communication resources based at least in part on a respective location and a respective elevation for the respective communication resource and the current location of the mobile system and a current elevation for the mobile system. The method further comprises determining if a new communication link should be established with at least one of the communication resources based at least on the LOS analyses that were performed and establishing the new communication link if it is determined that the new communication link should be established.

20 Claims, 5 Drawing Sheets

SYSTEM AND METHOD OF AUTOMATICALLY MAINTAINING A LINE-OF-SIGHT COMMUNICATION CHANNEL

BACKGROUND

As used here, a "communication channel" refers to a logical communication session that is established between two nodes. A logical communication channel is established over one or more communication links. As used here, a "communication link" refers to a physical, point-to-point connection between two nodes. For example, a communication channel can be established between two nodes using a single communication link when a direct communication link is able to be established between the two nodes. A communication channel can also be established between two nodes using more than one communication link when a direct communication link is not able to be established between the two nodes and, instead, the two nodes communicate with each other via two or more communication links one or more intermediary nodes.

Maintaining a continuous, active communication channel using line-of-sight (LOS) communication links can be difficult when the nodes that communicate over the communication channel change their relative position, direction, and/or orientation (for example, due to the movement of one, some, or all of the nodes). As a node moves, the particular LOS communication links that are used to implement the LOS communication channel may need to change. For example, when two nodes are communicating over a communication channel and one of the nodes moves into an area that does not have sufficient LOS to maintain a direct LOS communication link with the other node, both nodes typically need to establish different communication links over which the communication channel can be maintained.

Maintaining a continuous, active LOS communication channel can be especially difficult in cluttered environments such as urban areas. The difficulty in maintaining continuous, active LOS communication channels can wreak havoc on applications that require communication channels that are open at all times. Emergency response situations (for example, natural disasters or biological, chemical, or terrorist attacks) require continuous communication channels between agents in the field and other agents and/or headquarters.

Maintaining such communication channels can prove difficult when traveling through areas where the agents do not know where good LOS communication links can be established. In such situations, it can be difficult for an agent to know where to go to establish good LOS communication links. Even when the agents do know where to go to establish good LOS communication links, it can be difficult for an agent to keep a communication channel open as the agent moves through an area. This is because conventional communication equipment typically requires the agent to manually select an appropriate LOS communication link to use.

Although some communication equipment includes functionality for automatically attempting to establish a communication link, such functionality is typically only invoked after a communication link has been dropped and does not work to maintain a continuous, active LOS communication channel by establishing new communication links when necessary. Moreover, when a communication link cannot be established in a given location, such functionality typically does not provide any information as to other locations where a communication link could be established.

SUMMARY

One exemplary embodiment is directed to a method of automatically maintaining a line-of-sight communication channel. The method comprises determining information about each communication resource that is accessible in a region through which a mobile system is moving. The information about each communication resource includes, for example, a respective location for that respective communication resource. The method further comprises determining information about the mobile system. The information about the mobile system includes, for example, a current location for the mobile system. The method further comprises performing a line-of-sight (LOS) analysis for each of the communication resources based at least in part on the respective location and a respective elevation for the respective communication resource and the current location of the mobile system and a current elevation for the mobile system. The elevation for each communication resource is obtained from topological information maintained at the mobile system using the respective location for that respective communication resource. The current elevation for the mobile system is also obtained from the topological information using the current location for the mobile system. The method further comprises determining if a new communication link should be established with at least one of the communication resources based at least on the LOS analyses that were performed and establishing the new communication link if it is determined that the new communication link should be established.

In some implementations of such an exemplary embodiment, performing a LOS analysis for each of the communication resources further comprises determining an optimal setting for establishing a respective communication link with that respective communication resource. In such implementations, the method further comprises determining if a setting for a current communication link that is established with the mobile system should be adjusted based at least on the LOS analyses that were performed and adjusting the setting if it is determined that the setting should be adjusted.

Also, in some implementations of such an exemplary embodiment, the method further comprises outputting information about the communication resources in the region for a user of the mobile system.

DRAWINGS

DETAILED DESCRIPTION

Figure 1:
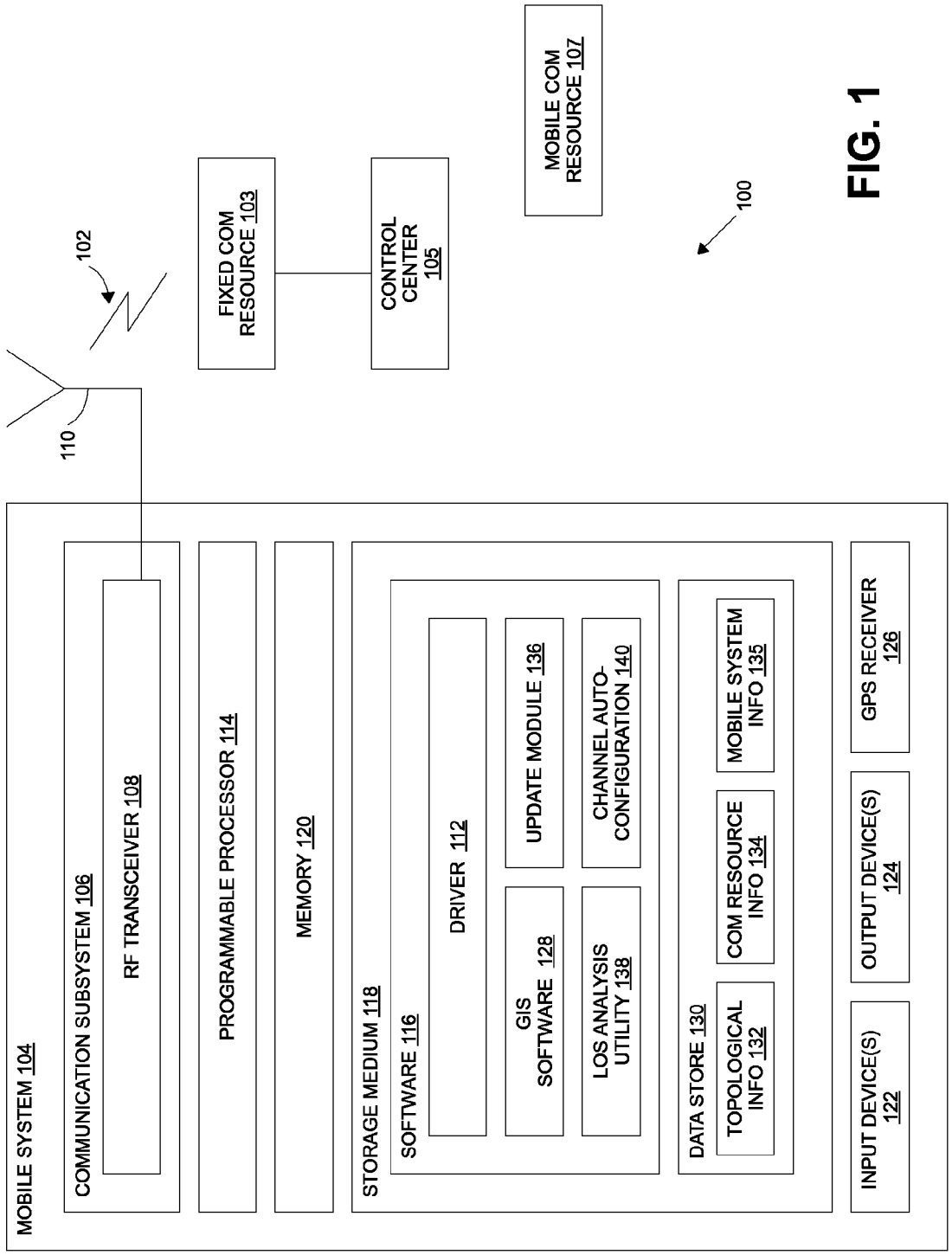
FIG. 1 is a block diagram of one embodiment of an automatic global positioning system (GPS)-geographic information system (GIS) link configuration system.

FIG. 1 is a block diagram of one embodiment of an automatic global positioning system (GPS)-geographic information system (GIS) link configuration system 100. The automatic GPS-GIS link configuration system 100 is used to automatically configure a line-of-sight (LOS) wireless communication link 102 in order to automatically maintain a continuous, active communication channel.

The system 100 is implemented as a part of mobile device or system 104. For example, in one implementation of such an embodiment, the system 100 is integrated into or used with a vehicle (for example, a car or truck). In another implementation of such an embodiment, the system 100 is configured and packaged to be used by a person (for example, in a backpack).

The continuous, active communication channel is established and maintained between the mobile system 104 and another node. In the particular embodiment shown in FIG. 1, the other node is a control center 105. The communication channel is established with the control center 105 via one or more communication resources. In this embodiment, there are two types of communication resources—fixed communication resources and mobile communication resources. A fixed communication resource is a communication resource that remains in a fixed location and typically does not move. Examples of fixed communication resources include communication base station towers. A mobile communication resource is a communication resource that has the ability to move. Examples of mobile communication resources include communication systems that are deployed on vehicles or persons.

In the example shown in FIG. 1, a LOS communication channel is established between the mobile system 104 and the control center 105 via one fixed communication resources 103 (for example, a base station tower), which in turn in coupled to the control center 105 via a wired connection. In other situations, the mobile system 104 establishes a LOS communication channel with the control center 105 using two LOS communication links—a first LOS communication link between the mobile system 104 and a mobile communication resource 107 (for example, another mobile system) and a second LOS communication link between the mobile communication resource 107 and the fixed communication resource 103, which in turn is coupled to the control center 105.

The system 100 comprises a communication subsystem 106 that is used to establish and communicate over a communication link 102. In the particular embodiment shown in FIG. 1, the communication subsystem 106 comprises a suitable radio frequency (RF) transceiver 108 for transmitting and receiving RF signals over the communication link 102. Also, in the particular embodiment shown in FIG. 1, the communication subsystem 106 includes one or more antennas 110 that are coupled to the transceiver 108. RF signals transmitted by the transceiver 108 are radiated from the antenna 110, and RF signals received by the transceiver 108 are initially received at the antenna 110. In some implementations of this embodiment, at least one directional antenna is used. In other implementations, at least one omnidirectional antenna is used. The communication subsystem 106 includes other conventional components and functionality known to those skilled in the art including, for example, modulators, demodulators, filters and/or amplifiers. Also, a suitable software driver 112 is used to implement one or more protocols layers for establishing and communicating over the communication link 102 using the transceiver 108. In other embodiments, other types of transceivers are used (for example, a free-space optics transceiver).

The system 100 further comprises one or more programmable processors 114 for executing software 116. The software 116 comprises program instructions that are stored (or otherwise embodied) on an appropriate storage medium or media 118 (such as flash or other non-volatile memory, magnetic disc drives, and/or optical disc drives) from which at least a portion of the program instructions are read by the programmable processor 114 for execution thereby. Although the storage media 118 is shown in FIG. 1 as being included in, and local to, the mobile system 104, it is to be understood that remote storage media (for example, storage media that is accessible over the communication link 102) and/or removable media can also be used. The mobile system 104 also includes memory 120 for storing the program instructions (and any related data) during execution by the programmable processor 114. Memory 120 comprises, in one implementation, any suitable form of random access memory (RAM) now known or later developed, such as dynamic random access memory (DRAM). In other embodiments, other types of memory are used.

One or more input devices 122 are communicatively coupled to the programmable processor 114 by which a user is able to provide input to the programmable processor 114. Examples of input devices include a keyboard, keypad, touch-pad, pointing device, button, switch, and microphone. One or more output devices 124 are also communicatively coupled to the programmable processor 114 on or by which the programmable processor 114 is able to output information or data to a user. Examples of output devices 124 include visual output devices such as liquid crystal displays (LCDs) or light emitting diodes (LEDs) or audio output devices such as speakers.

The system 100 further comprises a global positioning system (GPS) receiver 126 that is used to receive signals transmitted by GPS satellites (typically, from at least four GPS satellites) and to generate position, velocity, acceleration, and/or direction information from the received signals.

The system 100 comprises appropriate buses and interfaces (not shown) for communicatively coupling the various components of the system 100 to one another.

The software 116 comprises GIS software 128. The GIS software 128 can be implemented using commercial off the shelf (COTS) GIS software that is configured and/or extended to operate as described here. The GIS software 128 interacts with a data store 130 in which topological information 132 about a given region is stored. The topological information 132 includes elevation information that indicates the elevation of each point within the region. In addition, the topological information 132 includes information about natural and man-made structures (also referred to here as "obstructions") that are located at each point in the region. Such information includes the height of such natural and man-made structures.

Communication resource information 134 is also stored in the data store 130. The communication resource information 134 includes information about the location of each fixed and mobile communication resource that is located within the region of interest. The location of each communication resource is used as a key to find the topological information stored in the data store 130 associated with that location. The communication resource information 134 also includes information about the height of a respective antenna associated with each fixed and mobile communication resource that is located within the region of interest. The communication resource information 134 also includes information about the particular communication capabilities (for example, capacity and bandwidth) of each communication resource and how many hops are required to establish a channel with the control center 105 using that communication resource.

Also, the communication resource information 134 identifies the coverage area for each of the communication resources. The coverage area information also identifies the quality of communication link (for example, the data rate and signal strength) that can be established at each location within the coverage area.

Information 135 about the mobile system 104 is also stored in the data store 130. Examples of such information 135 include the height of the antenna 110 of the mobile system 104, the communication capabilities of the mobile system 104, and the coverage area of the mobile system 104.

The software 116 comprises an update module 136 that receives information about the communication resources that are currently within the region and uses the information to update the communication resource information 134 stored in the data store 130. This updated information can be received from the control center 105 using the communication channel that is maintained by the mobile system 104. For example, in one implementation of such an embodiment, the control center 105 monitors the communication resources that are within the region (for example, by monitoring the location of the mobile communication resources and the capacity utilization of both mobile and fixed communication resources). In such an implementation, the control center 105 periodically broadcasts an "update" message on all of the active communication channels that are established with nodes in the region. The update messages contain updated information about the communication resources that are currently within the region. The update module 136 in the mobile system 104 uses the updated information to update, in real-time, the communication resource information 134 stored in the data store 130.

The software 116 further comprises a line of sight (LOS) analysis utility 138. In this embodiment, the LOS analysis utility 138 is provided with the locations of two nodes and the height of any antennas used by the nodes. The LOS analysis utility 138 determines if a LOS communication link can be established between those two nodes. If a LOS communication link can be established, the LOS analysis utility 138 also determines one or more attributes of such a LOS communication link (for example, signal strength, reliability, and/or data rate). Typically, one of the nodes would be the mobile system 104 and the other node would be a particular fixed or mobile communication resource. The LOS analysis utility 138 interacts with the GIS software 128 and data store 130 to obtain topological information 132 for the locations of the two nodes as well as all the points along a line that extends between those two nodes. The obtained topological information 132 includes the elevation at the locations of the two nodes, the elevation at each point along the line that extends between the two nodes, and the height of any natural or man-made obstructions that are on that line. In this particular embodiment, the LOS analysis utility 138 is also provided with communication resource information 134 for the two nodes. The LOS analysis utility 138 can be implemented using COTS LOS analysis software that is configured and/or extended to operate as described here.

The software 116 further comprises channel auto-configuration functionality 140. The channel auto-configuration functionality 140 is used to automatically establish and maintain a continuous, active LOS communication channel. As used herein, to perform an act "automatically" means to perform the act without manual intervention or action by a user. The auto-configuration functionality 140 establishes a LOS communication link 102 over which the communication channel is implemented. Also, the auto-configuration functionality 140 determines, based on the movement of the mobile system 104 and/or one or more of the communication resources within the region, when it should establish a different LOS communication link over which to maintain the LOS communication channel. In this embodiment, the auto-configuration functionality 140 is also configured to automatically adjust one or more adjustable settings for any LOS communication link that is currently established. The auto-configuration functionality 140 adjusts such a setting to an optimal value, which is determined by the LOS analysis utility 138 as described below. Examples of such settings include transmission power, frequency, modulation scheme, orientation of the antenna 110 (if a directional antenna is used) or, in embodiments where optical transceivers are used, optical transmit power or receiver sensitivity or detection threshold.

Figure 2:
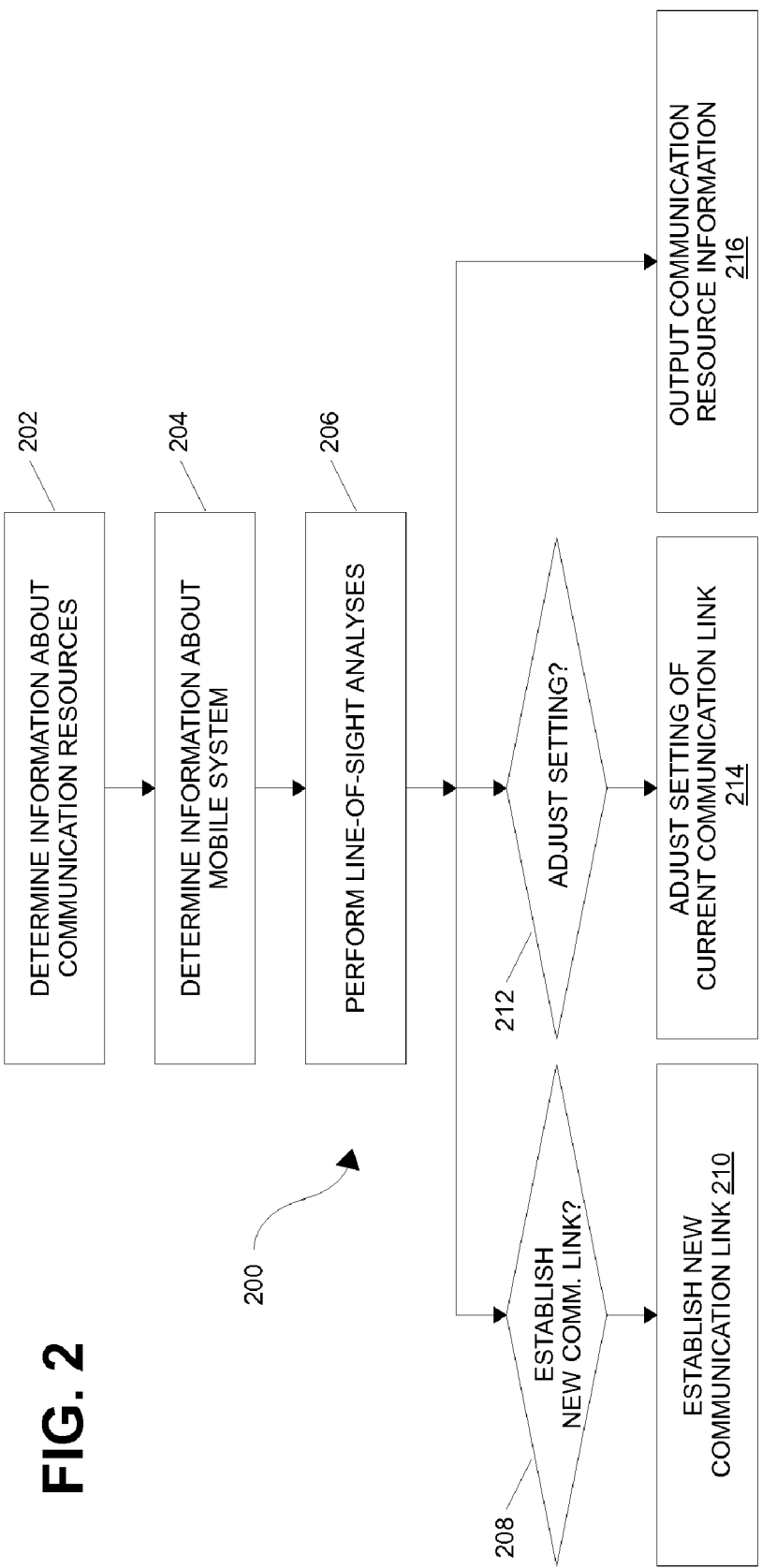
FIG. 2 is a flow diagram of one embodiment of a method of automatically maintaining a continuous, active LOS communication channel.

FIG. 2 is a flow diagram of one embodiment of a method 200 of automatically establishing and maintaining a continuous, active LOS communication channel. The embodiment of method 200 shown in FIG. 2 is described here as being implemented in the mobile system 104 of FIG. 1 (though other embodiments can be implemented in other ways). In particular, the embodiment of method 200 shown in FIG. 2 is described here as being implemented in the channel auto-configuration functionality 140.

Method 200 is periodically performed as the mobile system 104 moves through a given region that has a set of communication resources that the mobile system 104 can possibly use to establish communication links as it moves through the region. This region is also referred to here as the "current region." How frequently the processing of method 200 is performed can be adjusted, for example, based on how fast the mobile system 104 and/or mobile communication resources are moving and/or based on how fast the communication conditions are otherwise changing in the current region.

Method 200 comprises obtaining information about the communication resources that are within the current region (block 202). In this embodiment, the auto-configuration functionality 140 queries the GIS software 128 and data store 130 to identify all communication resources that are located with the current region. The GIS software 128 and data store 130, in response to the query from the auto-configuration functionality 140, identifies the communication resources that are located within the current region and returns information about the identified communication resources to the auto-configuration functionality 140 for use in connection with the processing of method 200. The information that is returned to the auto-configuration functionality 140 includes, for example, the location of each identified communication resource as well information about communication capabilities of each identified communication resource, information about how many hops are required to establish a communication channel using each identified communication resource, and information about a respective coverage area for each identified communication resource.

Method 200 further comprises determining information about the mobile system 104 (block 204). In this embodiment, the auto-configuration functionality 140 receives the current location of the mobile system 104 from the GPS receiver 126. The auto-configuration functionality 140 also receives information about the movement of the mobile system 104 (such as the current direction, velocity, and acceleration of the mobile system 104) from the GPS receiver 126. In other embodiments, current geographic information about the mobile system 104 is determined in other ways (for example, using information output from an inertial measurement unit (IMU), by tracking successive locations, and/or by using a combination of information output by a GPS receiver and an IMU in order to determine velocity and/or acceleration).

The auto-configuration functionality 140 also retrieves other information about the mobile system 104 from the data store 130, such as the height of the antenna 110 of the mobile system 104, the communication capabilities of the mobile system 104, and the coverage area of the mobile system 104.

Method 200 further comprises performing a line-of-sight analysis for each of the communication resources that are accessible in the current region (block 206). That is, a separate LOS analysis is performed between the mobile system 104 at the current location and each of the communication resources in the current region.

In this embodiment, the auto-configuration functionality 140 causes the LOS analysis utility 138 to perform each such LOS analysis. For each LOS analysis that is performed, the auto-configuration functionality 140 supplies to the LOS analysis utility 138 at least the location and orientation of the mobile system 104 and the location of the respective communication resource. Also, for each LOS analysis that is performed, the auto-configuration functionality 140 supplies to the LOS analysis utility 138 the height of the antenna 110 in the mobile system 104 and information about the communication capabilities of the mobile system 104, and the coverage area of the mobile system 104. In addition, in this particular embodiment, for each LOS analysis that is performed, the auto-configuration functionality 140 supplies to the LOS analysis utility 138 information about communication capabilities of each identified communication resource, information about how many hops are required to establish a communication channel using each identified communication resource, and information about a respective coverage area for each identified communication resource.

For each LOS analysis that is performed, the LOS analysis utility 138 interacts with the GIS software 128 and data store 130 to obtain topological information 132 for the locations of the mobile system 104 and the respective communication resource as well as all the points along a line that extends between the mobile system 104 and the communication resource. The obtained topological information 132 includes the elevation at the locations of the mobile system 104 and the communication resource, the elevation at each point along the line that extends between the mobile system 104 and the communication resource, the height of the antenna used by the communication resource, and the height of any natural or man-made obstructions that are on that line.

In this embodiment, each such LOS analysis determines if a LOS communication link can be established between the mobile system 104 and the respective communication resource and, if a LOS communication link can be established, one or more attributes of such a LOS communication link (for example, signal strength, reliability, and/or data rate). As used herein, a "candidate" communication link is a communication link that the LOS analysis determines can be established between the mobile system 104 and one of the communication resources. It is noted that it may be the case that one of the candidate communication links is currently established between the mobile system 104 and one of the communication resources. This communication link is also referred to here as the "current communication link."

Also, in the embodiment shown in FIG. 2, as a part of the LOS analysis that is performed for each candidate communication link, the LOS analysis utility 138 determines the optimal settings for any settings that can be adjusted. For example, the LOS analysis utility 138 can determine one or more of the following (if adjustable): an optimal transmission power, frequency, modulation scheme, or orientation of the antenna 110, or, in embodiments where optical transceivers are used, optical transmit power or receiver sensitivity or detection threshold.

Method 200 further comprises determining if a new communication link should be established (block 208) and establishing the new communication link if it is determined that the new communication link should be established (block 210). In this embodiment, the auto-configuration functionality 140 ranks each candidate communication link. Various criteria and scoring policies can be used to rank the candidate communication resources and determine if a new communication link should be established. Such criteria include, for example, the length of time that such a communication link can be maintained as the mobile system 104 moves in the current direction (which is determined by how long the mobile system 104 is expected to remain in the coverage area of each communication resource), the communication capabilities of each communication resource (for example, the reliability of the candidate communication link that can be established with the communication resource, or the bandwidth, signal strength, or data rate of the candidate communication link), and the number of hops used to communicate with the control center 105.

If no communication link is currently established, the auto-configuration functionality 140 interacts with the RF transceiver driver 112 to cause the highest-ranked candidate communication link to be established.

In one implementation of such an embodiment, if there is a communication link currently established and the LOS analysis process determines that the current communication link can be maintained for a predetermined threshold amount of time, then the auto-configuration functionality 140 does not establish a new communication link. If the LOS analysis process determines that the current communication link can only be maintained for less than the predetermined threshold amount of time, the auto-configuration functionality 140 interacts with the RF transceiver driver 112 to cause the highest-ranked candidate communication link to be established.

In another implementation, auto-configuration functionality 140 interacts with the RF transceiver driver 112 to cause the highest-ranked candidate communication link to be established if the highest-ranked candidate communication link is sufficiently better than the current communication link. Various criteria can be used to determine if the highest-ranked candidate communication link is sufficiently better than the current communication link (for example, if highest-ranked candidate communication link is more reliable by a predetermined threshold amount, can be maintained for an amount of time that is longer than a predetermined threshold amount and/or has a higher data rate that is greater than a predetermined threshold amount).

Method 200 further comprises, in the event that a new communication link is not established, determining if a setting for the current communication link should be adjusted (block 212) and adjusting the setting if it is determined that the setting should be adjusted (block 214). When the auto-configuration functionality 140 does not establish a new communication link and instead uses the currently established communication link, the auto-configuration functionality 140 checks the results of the LOS analysis for the current communication link to see if any of the adjustable settings should be changed (for example, if the current setting is not the same as the optimal setting determined by the LOS analysis). If it is determined that the setting should be changed, the auto-configuration functionality 140 interacts with the RF transceiver driver 112 to change the setting to the optimal value.

Method 200 further comprises outputting information about available communication resources for a user of the mobile device 104 (block 216). In the embodiment shown in FIG. 2, the auto-configuration functionality 140 displays for the user information about the current communication link (for example, if there is one and, if there is, the data rate and signal strength) and information about any alternative communication links that can be established. The user can use one of the input devices 122 to manually select one of the alternative communication links to establish, in which case the auto-configuration functionality 140 causes the selected communication link to be established. In addition, information about the coverage areas of each of the communication resources within the current region is displayed. For example, a two-dimensional map of the current region can be displayed on an output device 124 that shows each of the communication resources in the current region. The coverage areas for each of the communication resources can be overlaid on the map. The quality of communication link (for example, the data rate and signal strength) that can be established at each location within the coverage area can also be shown (for example, by using a different color or pattern for each quality level). By reviewing such information, a user can determine where to move mobile system 104 in order to establish a new communication link and/or to improve the quality of the communication link.

Figure 3A:
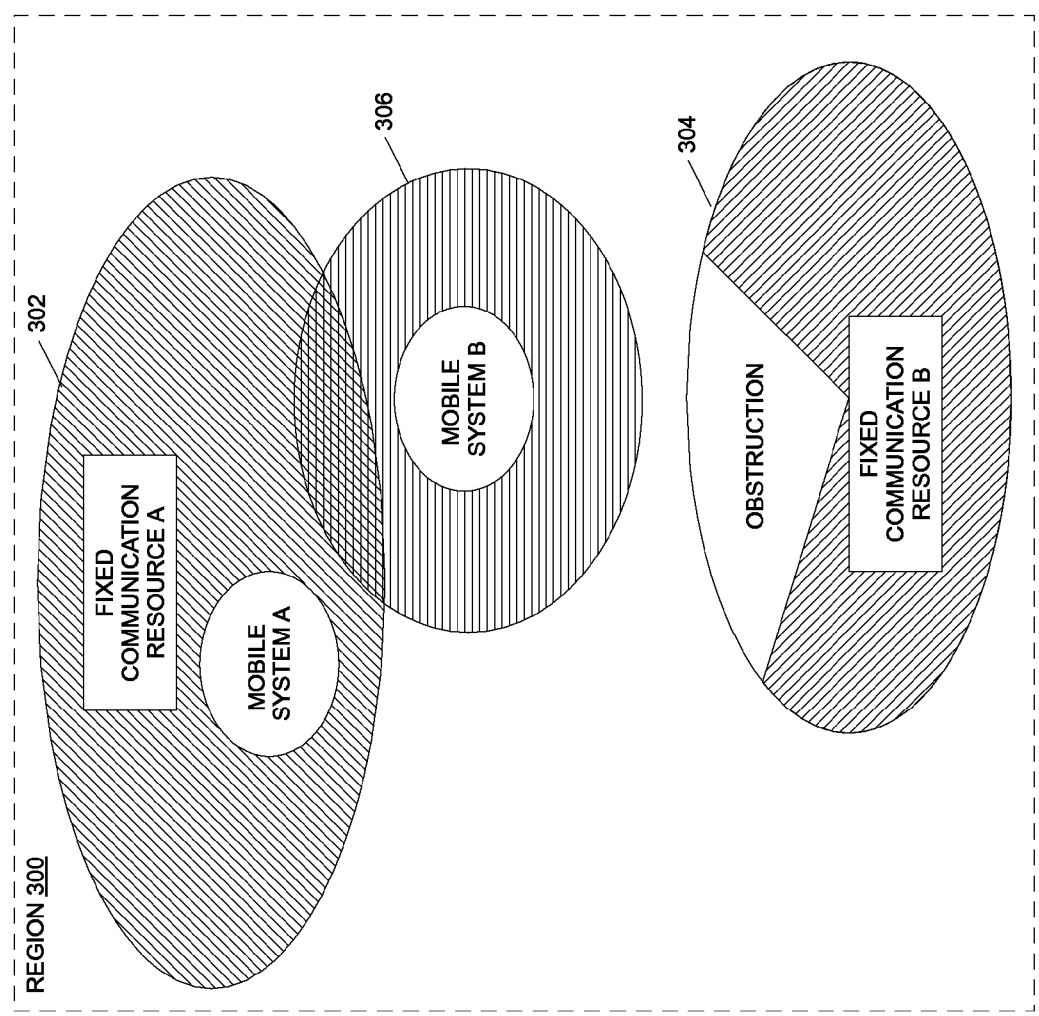
FIGS. 3A-3C illustrate one example of the operation of the system of FIG. 1 and the method of FIG. 2.
Figure 3B:
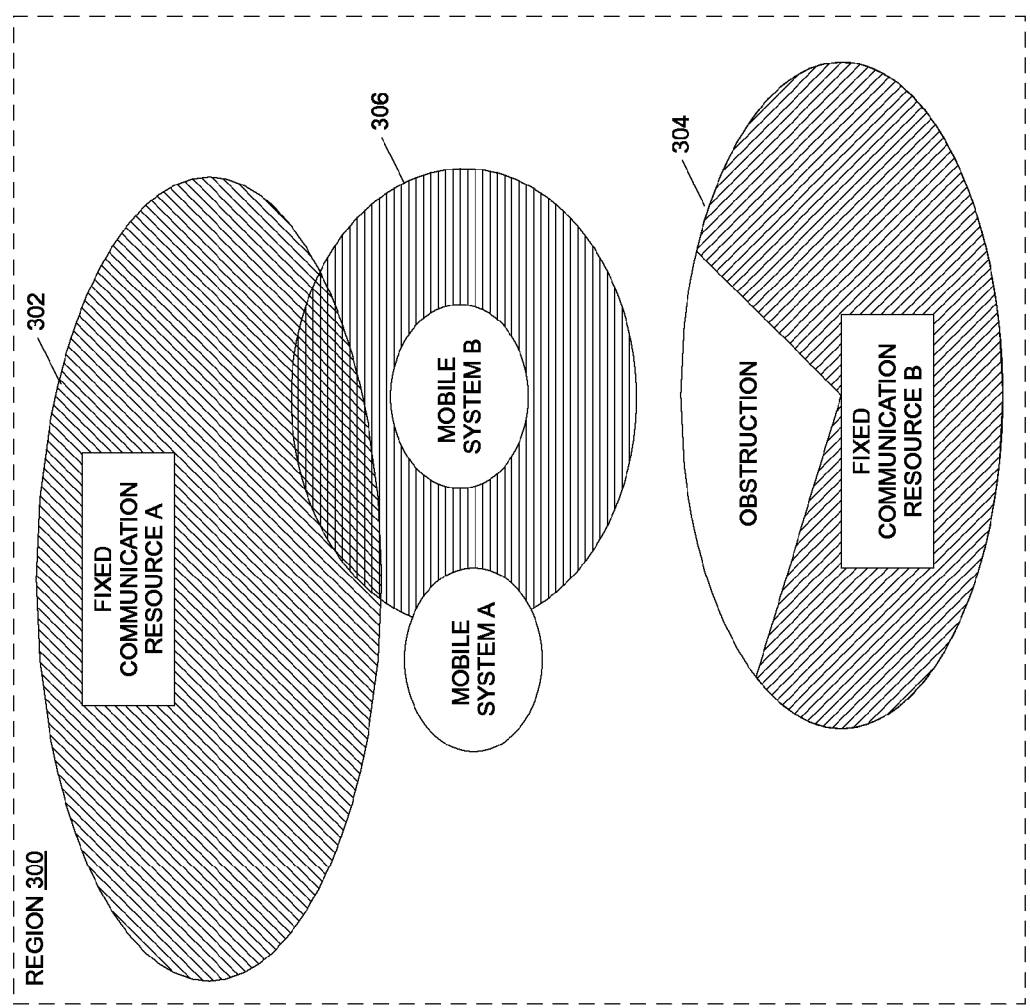
Figure 3C:
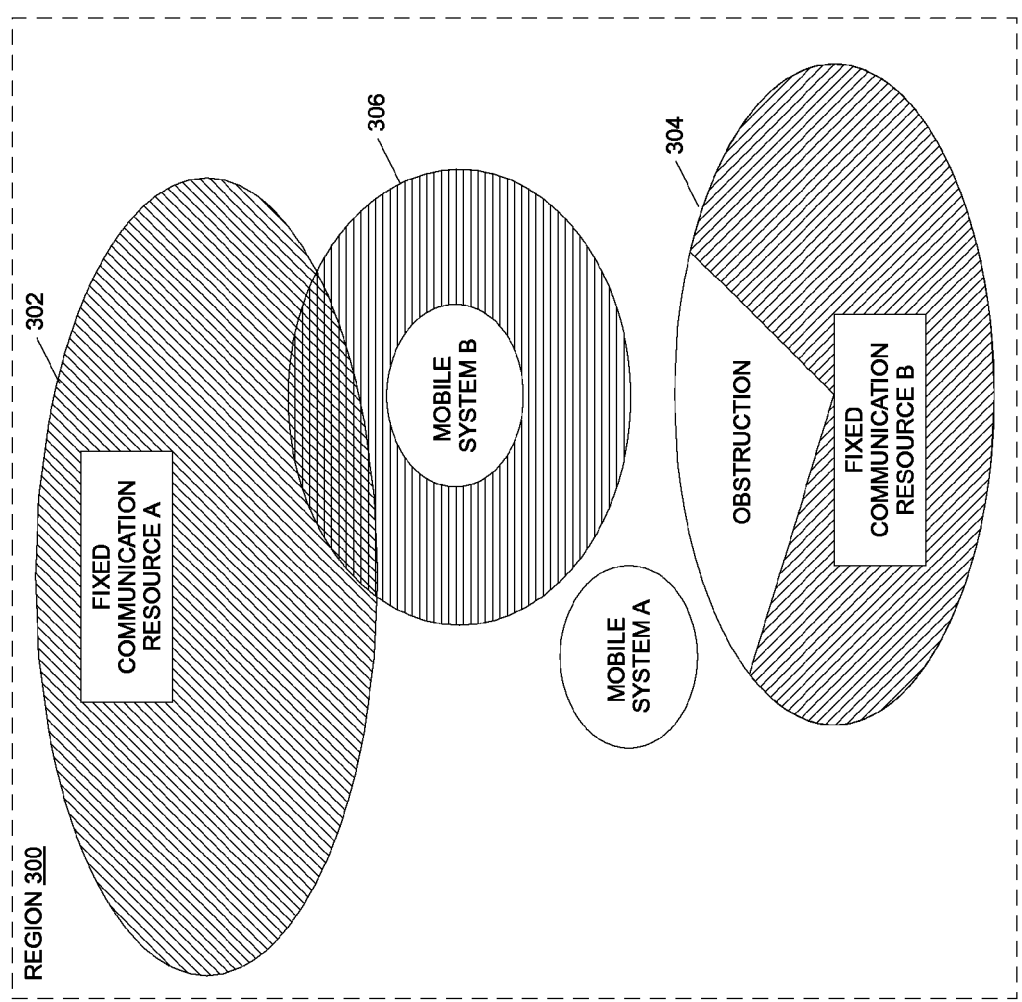

FIGS. 3A-3C illustrate one example of the operation of the mobile system 104 and method 200. In this example, a first mobile system (mobile system A in FIGS. 3A-3C) moves through a region 300 in which there are three communication resources—two fixed communication resources (fixed communication resources A and B in FIGS. 3A-3C) and one other mobile communication resource (mobile system B in FIGS. 3A-3C). The respective coverage areas 302, 304, and 306 for the fixed communication resources A and B and the other mobile system B are also shown in FIGS. 3A-3C.

As shown in FIG. 3A, mobile system A starts from a point within the coverage area of fixed communication resource A. As the mobile system moves from its starting point shown in FIG. 3A to the point shown in FIG. 3B, the auto-configuration functionality 140 repeatedly performs the processing of method 200. In this example, the auto-configuration functionality 140 maintains a communication link with fixed communication resource A until such time as the auto-configuration functionality 140 determines that a communication link should be established with mobile system B, which is coupled to the control center indirectly via fixed communication resource A.

As shown in FIG. 3C, mobile system A has moved outside of the coverage area of any of the communication resources in the region 300 (due the obstruction that prevents a communication link with fixed communication resource B) and is unable to maintain the current communication link. As a part of the processing of method 200, the auto-configuration functionality 140 displays for the user on an output device 124 the respective coverage areas 302, 304, and 306 for the fixed communication resources A and B and the other mobile system B. The user can then decide to move within the coverage area of one of the communication resources so that the auto-configuration functionality 140 is able to establish a communication link with that communication resource. When the user causes the mobile system 104 to move within the coverage area of one of the communication resources in the region, the auto configuration functionality 140 automatically causes a communication link to be established with that communication resource.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of automatically maintaining a line-of-sight communication channel, the method comprising:

determining information about each communication resource that is accessible in a region through which a mobile system is moving, wherein the information about each communication resource includes a respective location for that respective communication resource;

determining information about the mobile system, wherein the information about the mobile system includes a current location for the mobile system;

performing a line-of-sight (LOS) analysis for each of the communication resources based at least in part on the respective location and a respective elevation for the respective communication resource and the current location of the mobile system and a current elevation for the mobile system, wherein the respective elevation for that respective communication resource is obtained from topological information maintained at the mobile system using the respective location for that respective communication resource and the current elevation for the mobile system is obtained from the topological information using the current location for the mobile system; and determining if a new communication link should be established with at least one of the communication resources based at least on the LOS analyses that were performed and establishing the new communication link if it is determined that the new communication link should be established.

2. The method of claim 1, wherein performing a LOS analysis for each of the communication resources comprises determining an optimal setting for establishing a respective communication link with that respective communication resource; and wherein the method further comprises determining if a setting for a current communication link that is established with the mobile system should be adjusted based at least on the LOS analyses that were performed and adjusting the setting if it is determined that the setting should be adjusted.

3. The method of claim 1, further comprising outputting information about the communication resources in the region for a user of the mobile system.

4. The method of claim 3, wherein outputting information about the communication resources in the region for the user of the mobile system comprises at least one of:
outputting information about a respective coverage area for each of the communication resources in the region; and
outputting information indicating where the mobile system can move to establish a communication link.

5. The method of claim 1, further comprising updating the information about the communication resources that is maintained at the mobile system.

6. The method of claim 1, wherein the information about the communication resources includes a height of an antenna associated with each communication resource and the information about the mobile system includes a height of an antenna associated with the mobile system; and
wherein performing a LOS analysis for each of the communication resources comprises performing a LOS analysis for each of the communication resources using the height of the antenna associated with each communication resource and the height of the antenna associated with the mobile system.

7. The method of claim 1, wherein the information about the communication resources includes at least one of: information about communication capabilities of each communication resource, information about how many hops are required to establish a communication channel using each communication resource, and information about a respective coverage area for each communication resource; and
wherein determining if a new communication link should be established with at least one of the communication resources based at least on the LOS analyses that were performed comprises determining if a new communication link should be established with at least one of the communication resources based at least on the LOS analyses that were performed and the at least one of the information about the communication capabilities of each communication resource, the information about how many hops are required to establish a communication channel using each communication resource, and the information about the respective coverage area for each communication resource.

8. The method of claim 1, wherein the information about the mobile system comprises at least one of a current direction, a current velocity, and a current acceleration of the mobile system; wherein determining if a new communication link should be established with at least one of the communication resources based at least on the LOS analyses that were performed comprises determining if a new communication link should be established with at least one of the communication resources based at least on the LOS analyses that were performed and the at least one of the current direction, the current velocity, and the current acceleration of the mobile system.

9. The method of claim 1, wherein the current location of the mobile system is received from a GPS receiver included in the mobile system.

10. A mobile system for automatically maintaining a line-of-sight communication channel, the system comprising:
a transceiver to establish a line-of-sight communication link;
a global positioning system (GPS) receiver;
a data store to store topological information and information about communication resources that are accessible in a region through which the mobile system is moving;
a programmable processor to execute software, wherein the programmable processor is coupled to the transceiver, the GPS receiver, and the data store;
wherein the software, when executed by the programmable processor, is operable to cause the mobile system to:
determine information about each communication resource that is accessible in a region through which a mobile system is moving, wherein the information about each communication resource includes a respective location for that respective communication resource;
determine information about the mobile system, wherein the information about the mobile system includes a current location for the mobile system;
perform a line-of-sight (LOS) analysis for each of the communication resources based at least in part on the respective location of the respective communication resource and a respective elevation for the respective communication resource and the current location of the mobile system and a current elevation for the mobile system, wherein the respective elevation for that respective communication resource is obtained from the topological information using the respective location for that respective communication resource and the current elevation for the mobile system is obtained from the topological data using the current location for the mobile system; and
determine if a new communication link should be established with at least one of the communication resources based at least on the LOS analyses that were performed and establishing the new communication link if it is determined that the new communication link should be established.

11. The mobile system of claim 10, wherein the LOS analysis that is performed for each of the communication resources, as a part thereof, determines an optimal setting for an adjustable setting associated with establishing a respective communication link with each respective communication resource; and
wherein the software, when executed by the programmable processor, is operable to cause the mobile system to determine if a setting for a current communication link that is established with the mobile system should be adjusted based at least on the LOS analyses that were performed and adjust the setting if it is determined that the setting should be adjusted.

12. The mobile system of claim 10, further comprising at least one output device coupled to the programmable processor, wherein the software, when executed by the programmable processor, is operable to cause the mobile system to output, on the at least one output device, information about the communication resources in the region for a user of the mobile system.

13. The mobile system of claim 12, wherein the information about the communication resources in the region that is output on the at least one output device for the user of the mobile system comprises at least one of:
information about a respective coverage area for each of the communication resources in the region; and
information indicating where the mobile system can move to establish a communication link.

14. The mobile system of claim 10, wherein the software, when executed by the programmable processor, is operable to cause the mobile system to update information about the communication resources that is stored in the data store.

15. The mobile system of claim 10, wherein the information about the communication resources includes a height of an antenna associated with each communication resource and the information about the mobile system includes a height of an antenna associated with the mobile system; and wherein the LOS analysis that is performed for each of the communication resources uses the height of the antenna associated with each communication resource and the height of the antenna associated with the mobile system.

16. The mobile system of claim 10, wherein the information about the communication resources includes at least one of: information about communication capabilities of each communication resource, information about how many hops are required to establish a communication channel using each communication resource, and information about a respective coverage area for each communication resource; and wherein the software, when executed by the programmable processor, is operable to cause the mobile system to determine if a new communication link should be established with at least one of the communication resources based at least on the LOS analyses that were performed and the at least one of the information about the communication capabilities of each communication resource, the information about how many hops are required to establish a communication channel using each communication resource, and the information about the respective coverage area for each communication resource.

17. The mobile system of claim 10, wherein the information about the mobile system comprises at least one of a current direction, a current velocity, and a current acceleration of the mobile system;

wherein the software, when executed by the programmable processor, is operable to cause the mobile system to determine if a new communication link should be established with at least one of the communication resources based at least on the LOS analyses that were performed and the at least one of the current direction, the current velocity, and the current acceleration of the mobile system.

18. The mobile system of claim 10, wherein the transceiver comprises at least one of a radio frequency transceiver and a free-space optics transceiver.

19. A program product for automatically maintaining a line-of-sight communication channel using a transceiver included in a mobile system, the program-product comprising a processor-readable medium on which program instructions are embodied, wherein the program instructions are operable, when executed by at least one programmable processor included in the mobile system, to cause the mobile system to:

determine information about each communication resource that is accessible in a region through which the mobile system is moving, wherein the information about each communication resource includes a respective location for that respective communication resource;

determine information about the mobile system, wherein the information about the mobile system includes a current location for the mobile system;

perform a line-of-sight (LOS) analysis for each of the communication resources based at least in part on the respective location of the respective communication resource and a respective elevation for the respective communication resource and the current location of the mobile system and a current elevation for the mobile system, wherein the respective elevation for that respective communication resource is obtained from topological information maintained at the mobile system using the respective location for that respective communication resource and the current elevation for the mobile system is obtained from the topological information using the current location for the mobile system; and determine if a new communication link should be established with at least one of the communication resources based at least on the LOS analyses that were performed and establishing the new communication link if it is determined that the new communication link should be established.

20. The program product of claim 19, wherein the program instructions are further operable, when executed by at least one programmable processor included in the mobile system, to cause the mobile system to output for a user of the mobile system, on at least one output device coupled to the mobile system, information about the communication resources in the region.

* * * * *